(12) United States Patent
Bussit et al.

(10) Patent No.: US 9,341,216 B2
(45) Date of Patent: May 17, 2016

(54) ROLLING BEARING ASSEMBLY DEVICE FOR STEERING COLUMN

(71) Applicants: Sylvain Bussit, Monnale (FR); Daniel Jansen, Tours (FR); Tommy Jullien, Tours (FR); Thomas Lepine, Villandry (FR); Bruno Montboeuf, Cerelles (FR)

(72) Inventors: Sylvain Bussit, Monnale (FR); Daniel Jansen, Tours (FR); Tommy Jullien, Tours (FR); Thomas Lepine, Villandry (FR); Bruno Montboeuf, Cerelles (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/260,414

(22) Filed: Apr. 24, 2014

(65) Prior Publication Data

US 2014/0314362 A1     Oct. 23, 2014

(30) Foreign Application Priority Data

Apr. 23, 2013 (FR) ...................................... 1353670

(51) Int. Cl.
| | |
|---|---|
| *F16C 25/08* | (2006.01) |
| *F16C 35/07* | (2006.01) |
| *F16C 19/06* | (2006.01) |
| *B62D 1/16* | (2006.01) |
| *F16C 35/073* | (2006.01) |
| *F16C 19/16* | (2006.01) |

(52) U.S. Cl.
CPC ................ *F16C 35/073* (2013.01); *B62D 1/16* (2013.01); *F16C 19/163* (2013.01); *F16C 25/083* (2013.01); *F16C 2326/24* (2013.01)

(58) Field of Classification Search
CPC ...... F16C 19/06; F16C 25/083; F16C 35/073; F16C 2226/16; F16C 2326/24; F16C 19/163; B26D 1/16

USPC .......................................................... 384/517
See application file for complete search history.

(56) References Cited

U.S. PATENT DOCUMENTS

| | | | | |
|---|---|---|---|---|
| 1,116,845 | A * | 11/1914 | Rogers ........................... | 384/538 |
| 2,232,473 | A * | 2/1941 | Pulleyblank .................. | 384/518 |
| 3,395,956 | A * | 8/1968 | Fisher ............................ | 384/559 |
| 3,816,013 | A * | 6/1974 | Schuhmann ................... | 403/368 |
| 4,486,055 | A * | 12/1984 | Rohloff ......................... | 384/535 |
| 4,569,602 | A * | 2/1986 | Lundgren ..................... | 384/499 |
| 4,576,503 | A * | 3/1986 | Orain ............................ | 403/259 |
| 4,596,477 | A * | 6/1986 | Lundgren ..................... | 384/538 |
| 4,695,102 | A * | 9/1987 | Crotti ............................ | 305/100 |
| 4,699,528 | A * | 10/1987 | Gotman ........................ | 384/536 |
| 5,458,422 | A * | 10/1995 | Zernickel et al. ............. | 384/505 |
| 5,597,242 | A * | 1/1997 | Beeler ........................... | 384/517 |
| 5,829,891 | A * | 11/1998 | Beaman ........................ | 384/495 |
| 5,893,574 | A * | 4/1999 | Campagnolo ................. | 280/279 |

(Continued)

FOREIGN PATENT DOCUMENTS

| | | | |
|---|---|---|---|
| WO | 2004063577 | A2 | 7/2004 |

*Primary Examiner* — Alan B Waits
(74) *Attorney, Agent, or Firm* — Bryan Peckjian; SKF USA Inc. Patent Dept.

(57) ABSTRACT

The invention relates to a rolling bearing assembly device having an inner race, an outer race, at least one row of rolling elements disposed between the inner race and the outer race, and a sleeve mounted in the bore of the inner race. The sleeve provides a radial bearing flange, the lower edge of which has a portion that is inclined towards the interior of the device, the inclined portion in contact with a locking washer. The sleeve also provides at least one slot extending axially towards the inner race from the lower edge of the radial bearing flange, the lower edge being disposed on the opposite side from the inner race.

11 Claims, 6 Drawing Sheets

(56) References Cited

U.S. PATENT DOCUMENTS

| | | | |
|---|---|---|---|
| 5,975,766 A * | 11/1999 | Cau | 384/538 |
| 6,158,896 A * | 12/2000 | Zernickel et al. | 384/506 |
| 6,179,473 B1 * | 1/2001 | Ponson et al. | 384/537 |
| 6,227,715 B1 * | 5/2001 | Erhardt et al. | 384/518 |
| 6,375,360 B1 * | 4/2002 | Weisskopf et al. | 384/538 |
| 6,416,229 B1 * | 7/2002 | Wolf | 384/516 |
| 2008/0144986 A1 * | 6/2008 | Wajda et al. | 384/538 |
| 2010/0096913 A1 * | 4/2010 | Veux | 301/110.5 |
| 2010/0254646 A1 * | 10/2010 | Wendeberg et al. | 384/572 |
| 2010/0290730 A1 * | 11/2010 | Ostling et al. | 384/571 |
| 2012/0210819 A1 * | 8/2012 | Delos et al. | 74/492 |
| 2013/0327175 A1 * | 12/2013 | Bussit et al. | 74/492 |
| 2014/0033856 A1 * | 2/2014 | Bussit et al. | 74/492 |
| 2014/0157938 A1 * | 6/2014 | Erhardt | 74/492 |

\* cited by examiner

ROLLING BEARING ASSEMBLY DEVICE FOR STEERING COLUMN

FIELD OF THE INVENTION

The present invention relates to the field of rolling bearing assembly devices, in particular rolling bearing assemblies used in the steering columns of motor vehicles.

BACKGROUND OF THE INVENTION

Generally, steering columns comprise a shaft, one end of which is secured to a steering wheel operated by the driver of the vehicle, and the other end of which is secured to mechanical members intended to angularly position the wheels of the vehicle. The shaft of the steering column is mounted so as to rotate in a tubular housing by way of two rolling bearing assembly devices, each having a rolling bearing, generally an angular-contact ball bearing, which are mounted in opposition.

The rolling bearing assembly generally provides an inner race, an outer race and rolling elements disposed between the races. The rolling bearing assembly is mounted on the housing by its outer race and on the shaft directly or by way of a sleeve or a ring known as a tolerance ring. A sleeve provides the interface between the shaft and the inner race of the rolling bearing and compensates any geometric defects there may be between these two pieces. The sleeve allows the rolling bearing assembly to be mounted easily on the shaft without initial tightness.

However, it is preferable for the assembly to function with zero play between the sleeve and the shaft in order to ensure that the device is kept on the shaft and there is permanent contact between the races and the rolling elements of the rolling bearing assembly.

It is these drawbacks which the invention intends more particularly to address by proposing a new rolling bearing that is particularly economical, is simple to manufacture and to mount, and has an extended service life.

SUMMARY OF THE INVENTION

To this end, the invention relates to a rolling bearing assembly device having an inner race, an outer race, at least one row of rolling elements between the inner race and the outer race, and a sleeve mounted in the bore of the inner race.

In accordance with the invention, the sleeve provides a radial bearing flange, the lower edge of which has a portion that is inclined towards the interior of the device, the inclined portion being intended to be in contact with a locking washer. The sleeve also has at least one slot extending axially towards the inner race from the lower edge of the radial bearing flange, the lower edge being disposed on the opposite side from the inner race.

By virtue of the invention, the locking washer transmits an axial force to the sleeve via the inclined portion. This inclined portion thus transmits a radial component of the force into the sleeve.

The at least one slot provided in the sleeve gives a certain amount of flexibility of the sleeve, which can deform elastically under the radial component transmitted. The sleeve thus deforms radially in the direction of the rod mounted in the bore of the sleeve.

By virtue of the invention, the cylindrical portion of the sleeve allows the device to be centered and axially guided on the rod and any radial play between the sleeve and the rod is eliminated. In addition, the preload exerted on the sleeve is transmitted to the inner race and then to the outer race by way of the rolling elements, ensuring the permanent contact thereof.

Finally, the bulk of the rolling bearing assembly device is limited, since all the elements are included between the lower edge of the flange and the outer race.

According to advantageous but non-obligatory aspects of the invention, such a rolling bearing may include one or more of the following features, in any technically permissible combination:

The rolling elements are balls.
The rolling elements are in angular contact with the inner race and the outer race.
The rolling elements are kept regularly spaced apart circumferentially by a cage, which may be provided with at least one axial portion located radially between the inner race and the outer race.
The sleeve includes an axial cylindrical portion, the lower end of which is extended radially towards the outside of the device by the radial bearing flange.
At least one axial portion of the cage provides an axial retention means that engages with at least one of the inner and/or outer races.
The inner race provides an axial cylindrical portion bearing directly against the cylindrical portion of the sleeve.
The inner race provides a toric portion that forms, on its outer surface that is concave in axial section, a raceway for the rolling elements, the toric portion bearing directly against the elastic element.
The outer race provides an axial cylindrical portion that extends towards the inside of the rolling bearing assembly device by way of a radially directed toric portion, the toric portion forming, on its inner surface that is concave in axial section, a raceway for the rolling elements.
The outer race provides a radial edge that extends radially towards the outside of the device from the axial cylindrical portion, so as to engage with a tubular housing and to axially retain the assembly.
The radial bearing flange of the sleeve is in direct contact with the inner race.
The radial bearing flange of the sleeve provides a second portion that is inclined towards the inside of the device and is in angular contact with the inner race so as to transmit an angular preload onto the rolling bearing.
An annular elastic element is mounted axially between the radial bearing flange of the sleeve and the inner race, the elastic element having an inner bore that is able to bear against an outer surface of the sleeve.
The elastic element is in direct contact with the inner race.
The elastic element is in direct contact with the sleeve.
The elastic element provides an inner bore that is able to bear against the outer surface of the axial cylindrical portion of the sleeve.
The elastic element is annular and, in the free state, has a circular, parallelepipedal or triangular cross section.
The elastic element is an elastic O-ring separate from the sleeve.
The elastic element is overmolded on the inner race or on the outer surface of the sleeve.
The elastic element is made of synthetic material, for example based on elastomer, such as nitrile rubber, polyurethane, ethylene propylene diene monomer (EPDM), or thermoplastic elastomer (TPE) based on urethane (TPU) or styrene (TPS).
A groove is made on the outer periphery of the cylindrical portion of the sleeve, the groove being approximately consistent in shape with the elastic element.

The sleeve provides a single slot forming an opening and passing axially through the sleeve.

The sleeve provides at least two slots that are regularly spaced apart circumferentially.

The at least one slot in the sleeve has a circumferential extent of between 1° and 20°, advantageously between 1° and 5°.

The diameter of the outer cylindrical surface of the bearing flange of the sleeve is greater than or equal to the outside diameter of the elastic element in the free state.

The inclined portion of the lower edge of the bearing flange has a toric concave shape.

The invention also relates to a steering column having a housing, a shaft and at least one bearing assembly device according to any one of the preceding embodiments, mounted between the housing and the shaft.

BRIEF DESCRIPTION OF THE DRAWINGS

The invention will be better understood and further advantages thereof will become more clearly apparent in the light of the following description of an embodiment of a rolling bearing assembly device according to the principle of the invention, this description being given only by way of example and with reference to the appended drawings, in which.

DETAILED DESCRIPTION OF THE INVENTION

A rolling bearing assembly device, of central axis X1, referenced 1 in its entirety in FIGS. 1a to 4, is intended to be mounted in a steering column of a motor vehicle, in particular between a tubular housing A, of central axis XA, comprising a bore, and a rotary shaft (not shown). During normal operation, the axes X1 and XA are coincident.

Figure 1A:
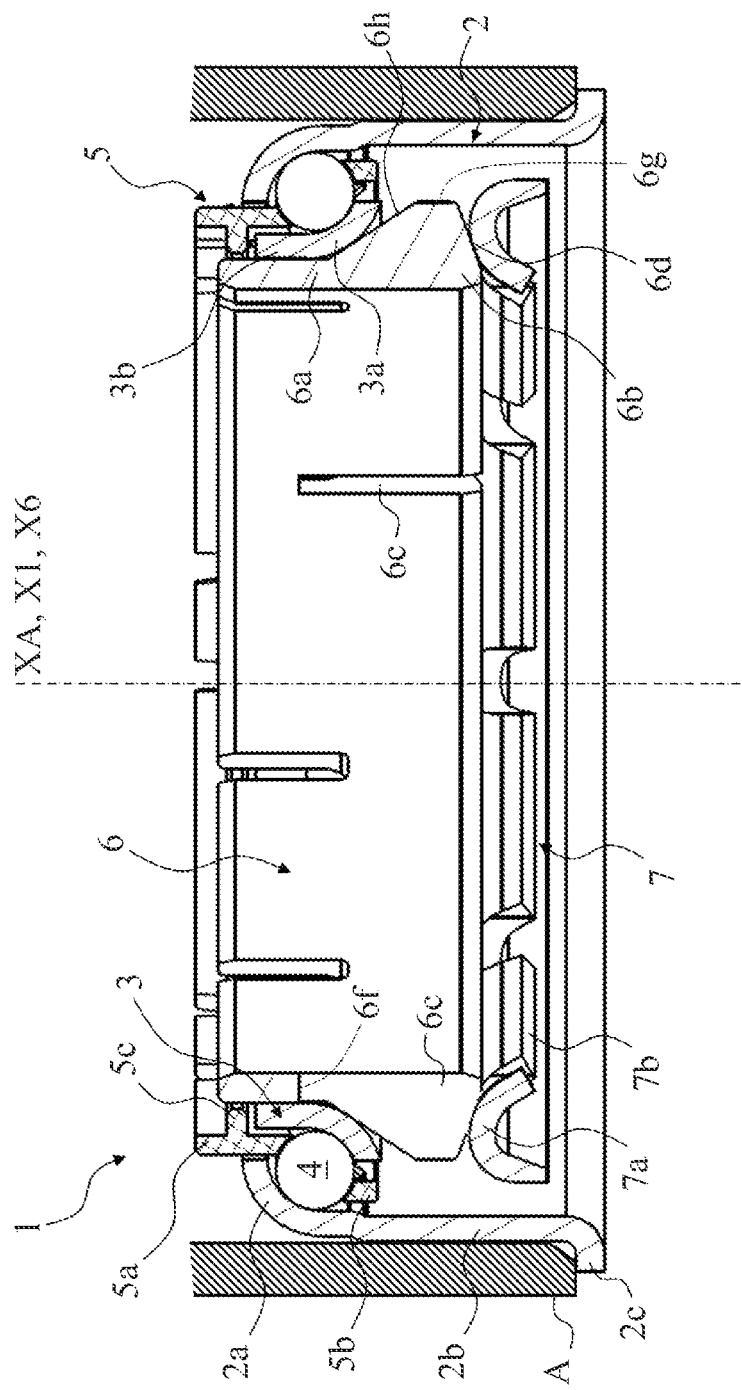
FIG. 1a is a view in axial section of a rolling bearing assembly device according to a first embodiment of the invention.
Figure 1B:
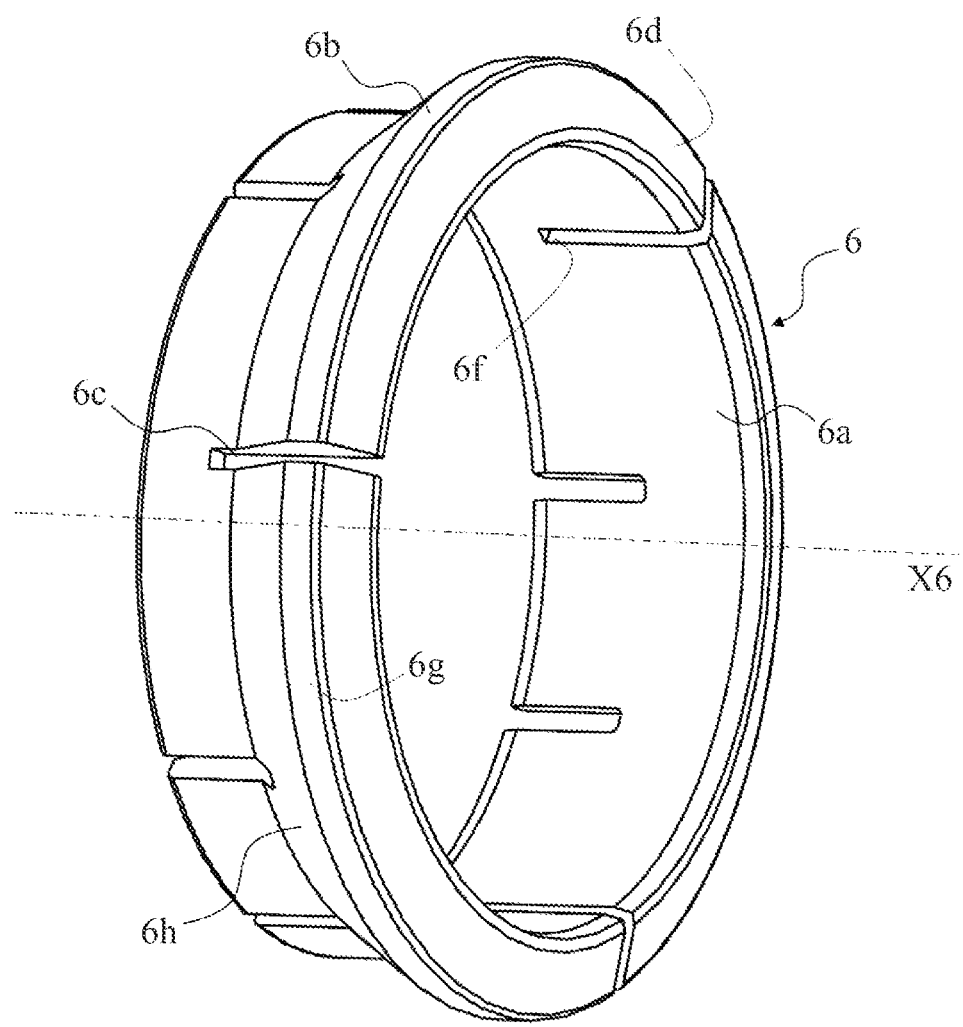
FIG. 1b is a perspective view of a sleeve according to the first embodiment of the invention.

As shown in FIG. 1, a rolling bearing assembly device 1 provides an inner race 2, an outer race 3, a row of rolling elements 4, in this case balls, a cage 5 for maintaining the circumferential spacing of the rolling elements 4, and a sleeve 6 or tolerance ring mounted in the inner race 3.

In this and the following embodiments, the adjectives "axial" and "radial" and the adverb "axially" are defined with respect to the central axis X1 of the rolling bearing 1, which is a relative rotation axis of the races 2 and 3. Thus, an axial portion or part is parallel to the axis X1, while a radial part or portion is perpendicular to this axis and surrounds it.

The outer race 2 provides a toric portion 2a, an axial portion 2b and a radial rim 2c. The toric portion 2a is directed radially towards the inside of the device 1 from the axial portion 2b. The toric portion 2a has an inner surface that is concave in axial section and forms a raceway for the rolling elements 4. The radial rim 2c is directed radially towards the outside of the device 1 from the axial portion 2b so as to engage with the tubular housing A and axially retain the assembly.

The inner race 3 provides a toric portion 3a and an axial cylindrical portion 3b. The toric portion 3a forms, on its outer surface that is concave in axial section, a raceway for the rolling elements 4. The raceways of the inner race 3 and outer race 2 are disposed on either side of a radial plane that passes through the centre of the rolling elements. The rolling bearing assembly device 1 affords angular contact for the rolling elements 4, thereby providing the ability to react axial load in one direction and radial load.

The inner race 3 and outer race 2 may be produced from a portion of tube or from a piece of sheet metal, for example by cutting and pressing.

The cage 5 provides an axial annular portion 5a of small diameter that passes between the free end of the toric portion 2a of the outer race 2 and an outer surface of the axial cylindrical portion 3b of the inner race 3. The axial annular portion 5a extends axially beyond the axial ends of the inner race 3 and is provided with a plurality of radial protuberances 5c that extend towards the sleeve 6 so as to axially retain the elements of which the rolling bearing is made.

The cage 5 also provides an annular portion 5b of large diameter that is disposed on the opposite side and passes between the free end of the toric portion 3a of the inner race 3 and an inner surface of the axial cylindrical portion 2b of the outer race 2.

The cage 5 may be made from a synthetic material, for example a polyamide possibly reinforced with a mineral filler.

The sleeve 6 is of central axis X6, which is coincident with the axes X1 and XA during normal operation, and provides an axial cylindrical portion 6a and a radial bearing flange 6b.

The axial cylindrical portion 6a is disposed in and bears directly against the bore of the axial cylindrical portion 3b of the inner race 3. The axial cylindrical portion 6a is also disposed around the driving shaft in its inner bore, thereby axially centring the rolling bearing and the shaft with respect to the sleeve 6.

The radial bearing flange 6b provides an outer cylindrical surface 6g and extends radially towards the outside of the device 1 from one end of the axial cylindrical portion 6a.

The radial bearing flange 6b of the sleeve 6 is in direct contact with the inner race 3 by way of a portion 6h that is inclined towards the inside of the device 1 and is in angular contact with the inner race 3 so as to transmit an angular preload onto the rolling bearing.

The sleeve 6 is made in one piece, preferably from a plastics material.

In accordance with the invention, the bearing flange 6b of the sleeve provides a lower edge that has a portion 6d that is inclined towards the inside of the device 1 and bears against a locking washer 7 which transmits an axial force onto the sleeve 6. This locking washer 7 axially retains the rolling bearing assembly device 1 and provides an annular part 7a that has a concave shape in axial section, and the upper outer surface of which bears against the lower edge 6d of the sleeve 6. The locking washer 7 is provided with a plurality of tabs 7b that extend radially towards the inside from the annular part 7a. The tabs 7b are approximately oblique and intended to flex elastically when the locking washer 7 is fitted onto the shaft and, through bracing against the shaft, prevent any axial movement of the locking washer 7 along the shaft in the opposite direction to the direction in which it was fitted.

In accordance with the invention, the sleeve 6 also provides slots 6c that extend axially towards the inner race 3 from the lower edge 6d, disposed on the opposite side from the inner race 2, of the bearing flange 6b, as far as a radial edge 6f of the axial cylindrical portion 6a. The slots 6c pass radially through the bearing flange 6b and a part of the axial cylindrical portion 6a of the sleeve 6. Such slots 6c give a certain amount of flexibility to the sleeve 6, which can deform elastically under a radial load.

Figure 2:
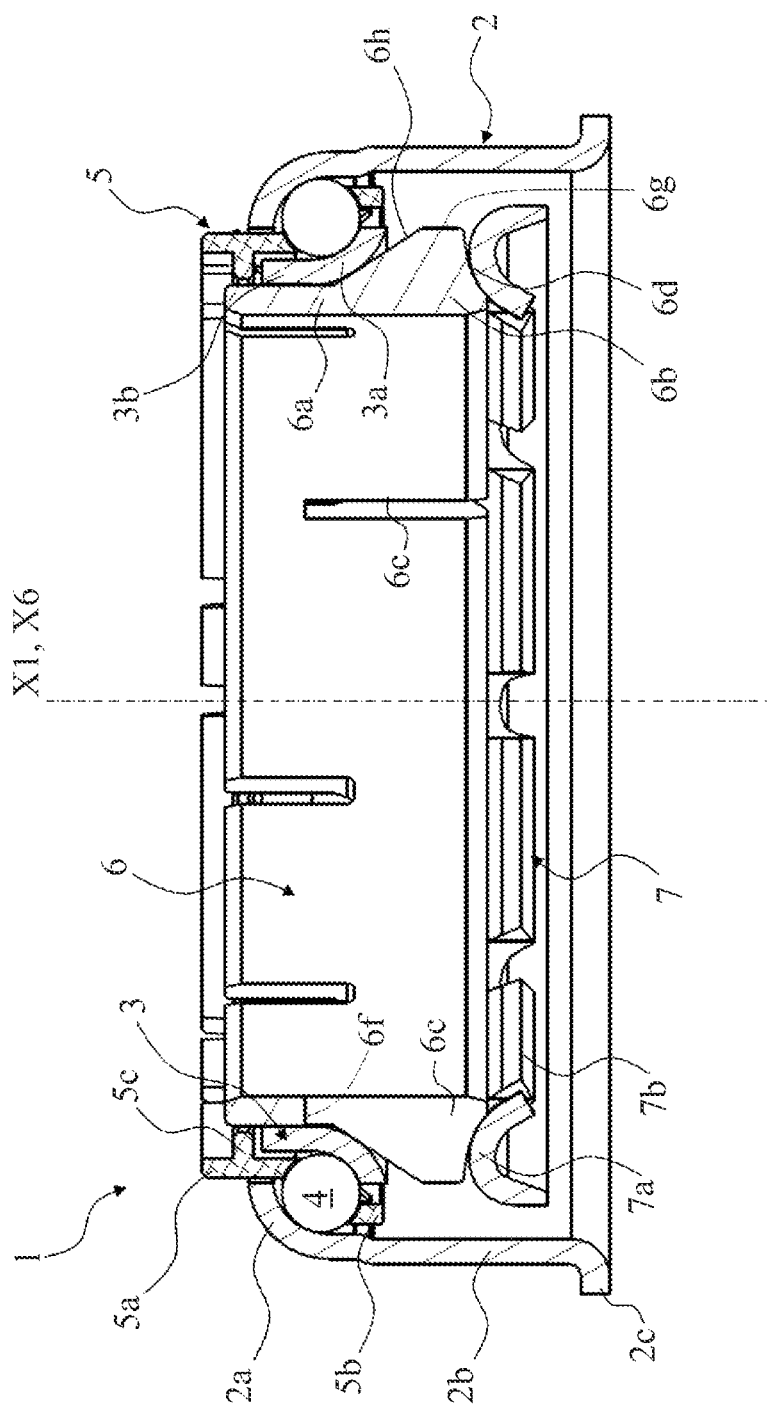
FIG. 2 is a view in axial section of a rolling bearing assembly device according to a second embodiment of the invention.

In the example illustrated in FIGS. 1 and 2, the sleeve 6 provides three slots 6c that are regularly spaced apart circumferentially and have a circumferential extent of 5°.

When the device 1 is preloaded, the locking washer 7 exerts a force on the sleeve 6 by way of its bearing contact with the inclined portion 6d of the lower edge of the radial bearing flange 6b. By way of this form, inclined towards the inside, of the lower edge 6d, a radial component is transmitted directly onto the radial bearing flange 6b, thereby deforming it elastically towards the inside of the device 1.

By virtue of the flexibility of the sleeve 6, this flexibility being obtained by the slots 6c, the sleeve 6 deforms elastically under the radial component transmitted by the locking washer 7 to the inclined portion 6d of the sleeve 6. The sleeve 6 thus deforms radially in the direction of the shaft mounted in the bore of the sleeve 6, thereby making it possible to prevent any radial play between the sleeve and the shaft and to axially keep the device 1 on the shaft.

A second embodiment illustrated in FIG. 2, in which identical elements have the same references, differs from the first embodiment only by way of the shape of the inclined portion 6d of the lower edge of the bearing flange 6b of the sleeve 6.

The inclined portion 6d has a toric concave shape approximately consistent in shape with the annular portion 7a of the locking washer 7, so as to ensure better circumferential distribution of the forces while ensuring constant contact between the locking washer 7 and the sleeve 6.

Figure 3:
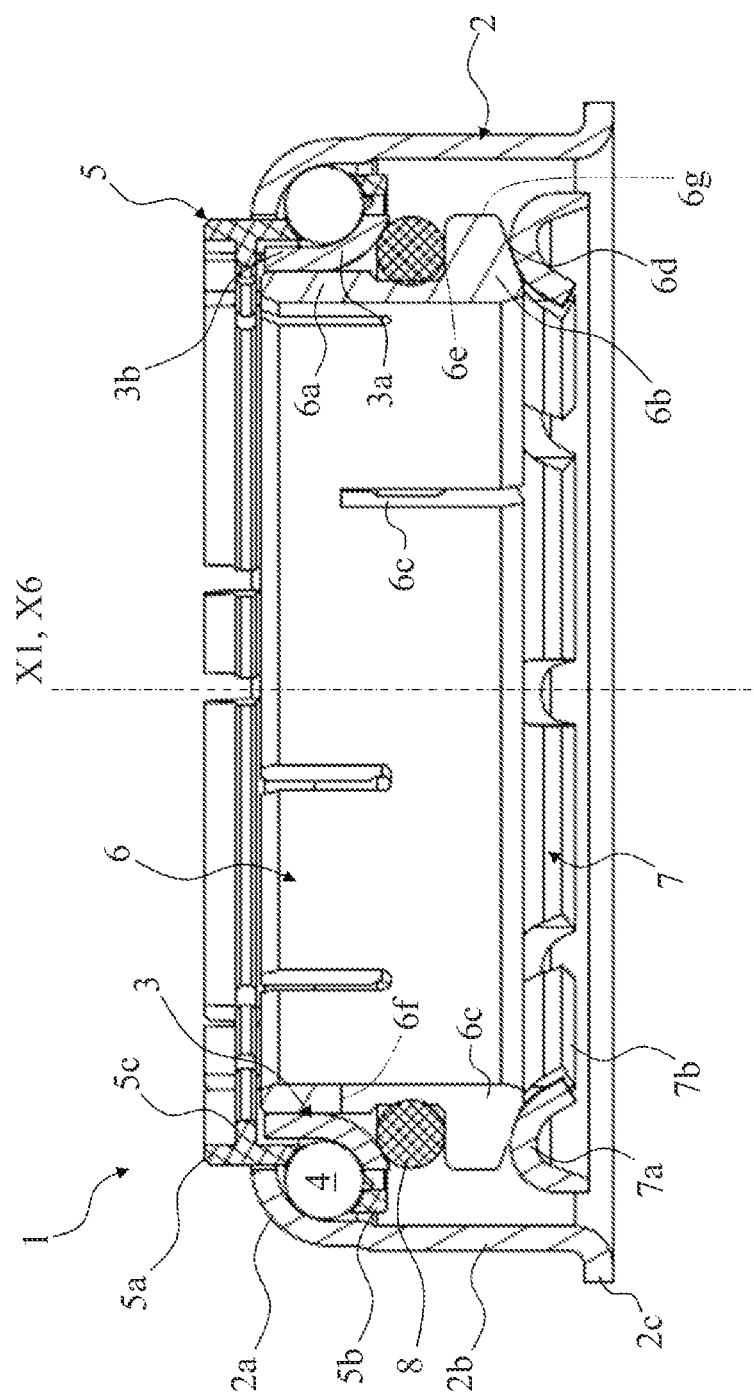
FIG. 3 is a view in axial section of a rolling bearing assembly device according to a third embodiment of the invention.

A third embodiment illustrated in FIG. 3, in which identical elements have the same references, differs from the first embodiment in that the rolling bearing assembly device 1 also provides an elastic element 8 separate from the sleeve 6 and able to exert an axial preloading force that is transmitted to the inner race 3.

The elastic element 8 is annular and is mounted axially between the radial bearing flange 6b of the sleeve 6 and the toric portion 3a of the inner race 3. The elastic element 8 continuously bears axially, around its entire periphery, against the radial bearing flange 6b of the sleeve 6.

In this embodiment, the sleeve 6 also provides a groove 6e on the outer periphery of the axial cylindrical portion 6a, the groove 6e being consistent in shape with the elastic element 3, so that it is axially kept around the sleeve 6. The elastic element 8 provides an inner bore that continuously bears around its entire circumference against the bottom of the groove 6e in the axial cylindrical portion 6a of the sleeve 6.

In the example illustrated in FIG. 3, the elastic element 8 is annular, toric and has a circular cross section in the free state. The outside diameter of the elastic element 8 in the free state is equal to the diameter of the outer cylindrical surface 6g of the bearing flange 6b of the sleeve 6.

The elastic element 8 is made of synthetic material, for example based on elastomer, such as nitrile rubber, polyurethane, ethylene propylene diene monomer (EPDM), or thermoplastic elastomer (TPE) based on urethane (TPU) or styrene (TPS).

When the elastic element 8 is subjected to an axial load by way of the locking washer 7 and the flange 6b of the sleeve 6, it transmits an angular force towards the toric portion 3a of the inner race 3. This angular force is subsequently transmitted towards the rolling elements 4 and the outer race 2, thereby preloading the rolling bearing assembly 1 and preventing any internal play and ensuring permanent contact between the elements.

Under this force, the elastic element 8 deforms both axially, by compression between the radial bearing flange 6b and the inner race 3, resulting in a decrease in its axial dimension, and radially, by an increase in its radial dimension. The radial expansion of the elastic element 8 allows the transmission of a radial component of the force exerted on the elastic element 8 towards the axial cylindrical portion 6a of the sleeve 6 against which it bears.

The combined forces of the radial force exerted by the deformation of the elastic element 8 and the radial force transmitted directly to the sleeve 6 by the inclined portion 6d allow the sleeve to be held more effectively on the rod.

By virtue of the flexibility of the sleeve 6, this flexibility being obtained by the slots 6c, the sleeve 6 deforms elastically under the radial component transmitted by the preloaded elastic element 8 and the inclined portion 6d of the sleeve 6. The sleeve 6 thus deforms radially in the direction of the rod mounted in the bore of the sleeve 6, thereby making it possible to prevent any radial play between the sleeve and the rod and to ensure that the device 1 is kept axially on the rod.

Figure 4A:
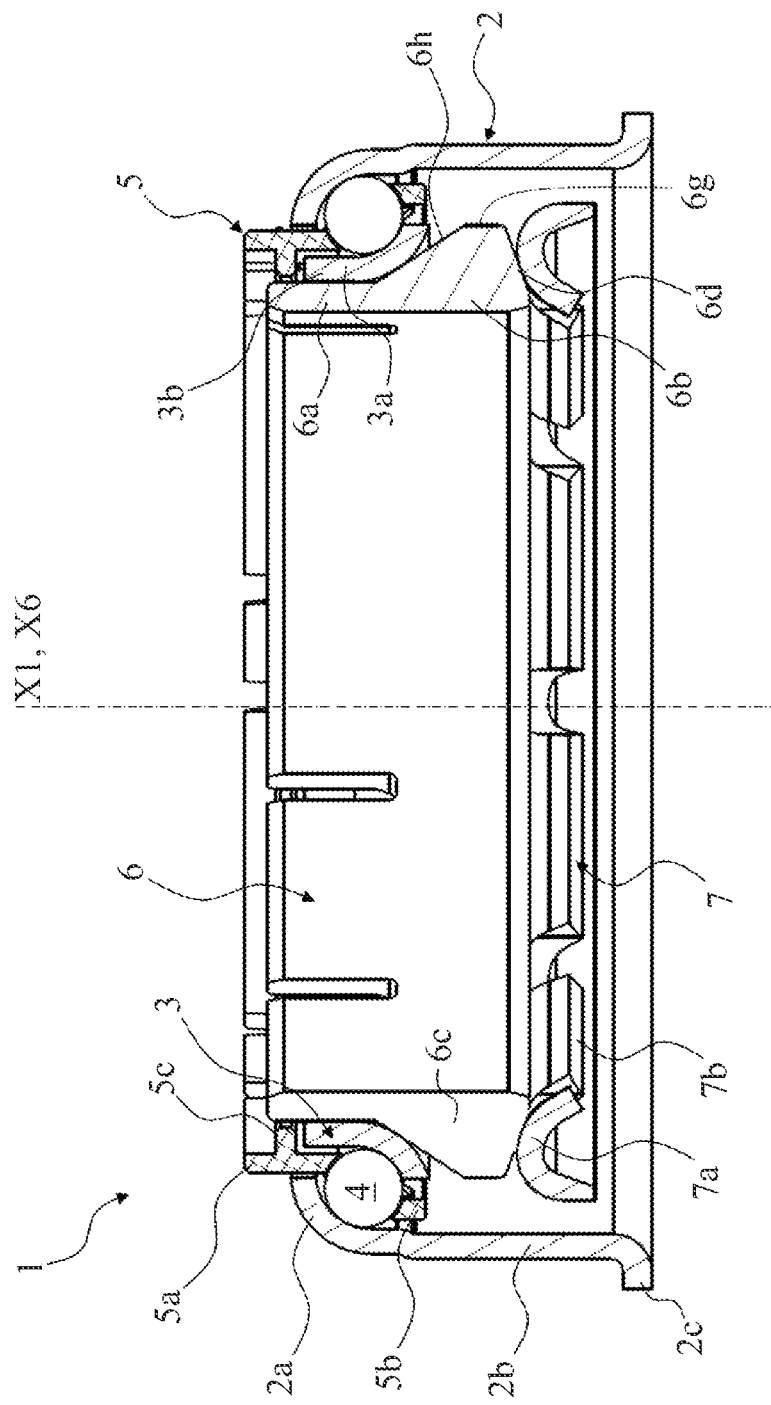
FIG. 4a is a view in axial section of a rolling bearing assembly device according to a fourth embodiment of the invention.
Figure 4B:
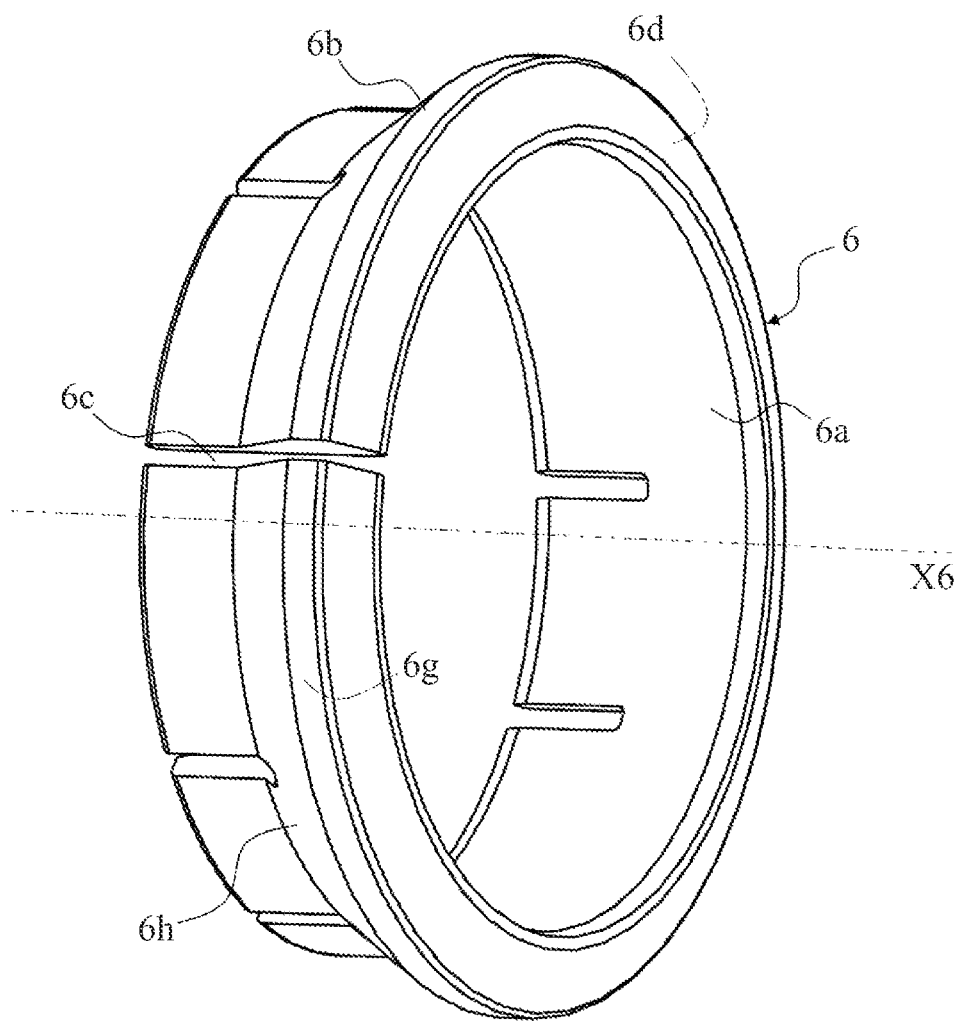
FIG. 4b is a perspective view of a sleeve according to the fourth embodiment of the invention.

A fourth embodiment illustrated in FIGS. 4a and 4b, in which identical elements have the same references, differs from the embodiments described above in that the sleeve 6 has a single slot 6c.

The single slot 6c forms an opening in the sleeve 6, passing both axially and radially through the sleeve in a given angular position. Such a single slot 6c makes it possible to do away with a plurality of slots as described in the previous embodiments, while ensuring, by itself, the elastic deformation of the sleeve 6.

The technical features of the embodiments and variants envisaged above may be combined with one another.

The invention claimed is:

1. A rolling bearing assembly device having an axis of rotation, comprising:
    an inner race having a bore and first and second axial ends,
    an outer race, and
    at least one row of rolling elements disposed between the inner race and the outer race, and
    a sleeve mounted in the bore of the inner race, wherein the sleeve being formed as a one-piece integral member, the sleeve having first and second sleeve axial ends and a radial bearing flange, the inner race is completely overlapped by the sleeve in the axial direction, a first portion of the sleeve extending axially away from the inner race and axially away from the first axial end of the inner race to form the first axial sleeve end, a second portion of the sleeve extending axially away from the inner race and axially away from the second axial end of the inner race to form the second axial sleeve end, the radial bearing flange having a bearing surface configured to non-threadably contact a locking washer located adjacent to the first axial sleeve end, the bearing surface extending outwardly radially from the first axial sleeve end and toward the second axial sleeve end to form an oblique surface relative to the axis of rotation, in axial cross section the oblique surface defines a continuous linear path from the first axial sleeve end to a part of the first portion of the sleeve that is at a maximum radial distance from the axis of rotation, the inner race being completely located axially between the part of the first portion of the sleeve and the second axial sleeve end, wherein
    the second portion of the sleeve that extends axially past the second axial end of the inner race and connects to the second sleeve axial end has a radially outer axially extending surface, the radially outer axially extending surface of the second portion having no radially outward protrusions thereon such that the second portion of the sleeve has a maximum diameter that is less than or equal to a minimum diameter of the inner race, and wherein the sleeve further provides at least one slot extending axially towards the inner race from the first axial sleeve end of the radial bearing flange.

2. The device according to claim 1, wherein the at least one slot forms an opening passing axially through the sleeve.

3. The device according to claim 1, wherein the at least one slot further provides at least two slots that are regularly spaced apart circumferentially.

4. The device according to claim 3, wherein the at least one slot in the sleeve has a circumferential extent of between one degree (1°) and twenty degrees (20°).

5. The device according to claim 1, wherein the radial bearing flange of the sleeve is in direct contact with the inner race and provides a second bearing surface that is oblique to the axis of rotation and in contact with the inner race.

6. The device according to claim 1, wherein the at least one slot does not extend completely through the sleeve in the axial direction such that the at least one slot terminates before reaching the second sleeve axial end.

7. A steering column comprising:
a housing,
a shaft, and
at least one rolling bearing assembly device with an axis of rotation and mounted between the housing and the shaft having;
an inner race having a bore and first and second axial ends,
an outer race, and
at least one row of rolling elements disposed between the inner race and the outer race, and
a sleeve mounted in the bore of the inner race, wherein the sleeve being formed as a one-piece integral member, the sleeve having first and second sleeve axial ends and a radial bearing flange, the inner race is completely overlapped by the sleeve in the axial direction, a first portion of the sleeve extending axially away from the inner race and axially away from the first axial end of the inner race to form the first axial sleeve end, a second portion of the sleeve extending axially away from the inner race and axially away from the second axial end of the inner race to form the second axial sleeve end, the radial bearing flange having a bearing surface configured to non-threadably contact a locking washer located adjacent to the first sleeve axial end, the bearing surface extending outwardly radially from the first sleeve axial end and toward the second sleeve axial end to form an oblique surface relative to the axis of rotation, in axial cross section the oblique surface defines a continuous linear path from the first sleeve axial end to a part of the first portion of the sleeve that is at a maximum radial distance from the axis of rotation, the inner race being completely located axially between the part of the first portion of the sleeve and the second axial end, wherein the second portion of the sleeve that extends axially past the second axial end of the inner race and connects to the second sleeve axial end has a radially outer axially extending surface, the radially outer axially extending surface of the second portion having no radially outward protrusions thereon such that the second portion of the sleeve has a maximum diameter that is less than or equal to a minimum diameter of the inner race, and wherein the sleeve further provides at least one slot extending axially towards the inner race from the first sleeve axial end of the radial bearing flange.

8. A rolling bearing assembly device comprising:
an inner race,
an outer race, and
at least one row of rolling elements disposed between the inner race and the outer race, and a sleeve mounted in the bore of the inner race, wherein
the sleeve provides a radial bearing flange, and an axial edge of the radial bearing flange having a portion that is inclined at an acute angle relative to an axis of rotation of the rolling bearing assembly, the portion being configured to contact with a locking washer, and wherein
the sleeve further provides at least one slot extending axially towards the inner race from the axial edge of the radial bearing flange, the axial edge being disposed on the opposite side of the sleeve from the inner race,
the sleeve provides at least two slots that are regularly spaced apart circumferentially,
the at least one slot in the sleeve has a circumferential extent of between one degree (1°) and twenty degrees (20°), and
wherein an annular elastic element is mounted axially between the radial bearing flange of the sleeve and the inner race, the elastic element having an inner bore that is able to bear against an outer surface of the sleeve.

9. The device according to claim 8, wherein the elastic element is able to bear against an axial cylindrical portion of the sleeve.

10. The device according to claim 9, wherein the elastic element is an elastic O-ring separate from the sleeve.

11. The device according to claim 10, wherein the elastic element is overmolded on the inner race or on the outer surface of the sleeve.

* * * * *